United States Patent Office 2,767,184
Patented Oct. 16, 1956

2,767,184
1,3-DIAZACYCLOALKANE COMPOUNDS

Arthur F. McKay, Pointe Claire, Quebec, and David L. Garmaise, Montreal, Quebec, Canada, assignors to Monsanto Canada Limited, La Salle, Quebec, Canada, a body politic and corporate No Drawing. Application November 10, 1955, Serial No. 546,278

7 Claims. (Cl. 260—256.6)

The present invention relates to novel 1,3-diazacycloalkanes and to a process for their preparation.

More specifically, the products of the present invention are 1-(dialkylaminoalkyl)-1,3-diazacycloalkane-2-thione and correspond to the following general formula

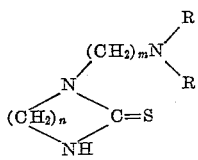

wherein R stands for a straight or branched chain alkyl radical having from 1 to 8 carbon atoms and $n$ and $m$ each stands for the integer 2 or 3. In accordance with the invention, acid salts of the novel 1,3-diazacycloalkanes are also provided.

The compounds are prepared by addition of carbon disulfide to a polyamine of the type

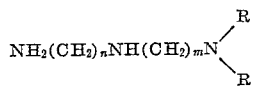

in which R is an alkyl radical containing from one to eight carbon atoms, in the presence of an inert solvent. Among suitable inert solvents there may be mentioned alcohol, for example, ethanol, propanol, butanol and similar alcohols, hydrocarbon solvents, for example, petroleum ether, kerosene, benzene and others of this class, or ethereal solvents, for example, ethyl ether, propyl and other similar ethers. The solvent is chosen on the basis of its inertness towards either the amine or the carbon disulfide under the conditions of the reaction.

The addition of carbon disulfide or carbon disulfide in solution to the amine solution is preferably carried out at temperatures in the range of 0–35° C. The lower temperatures are preferred.

In carrying out this reaction the order of addition of reagents may be reversed and the amine in solution may be added to a solution of the carbon disulfide under similar reaction conditions. One mole equivalent of carbon disulfide is used per mole equivalent of amine. The solid addition product, which is considered to be an internal salt of a dithiocarbamic acid, is removed by filtration.

The internal salt of the dithiocarbamic acid can be heated dry until the evolution of hydrogen sulfide ceases. This effects cyclization of the internal salt to give the desired compounds. This reaction may be illustrated as follows:

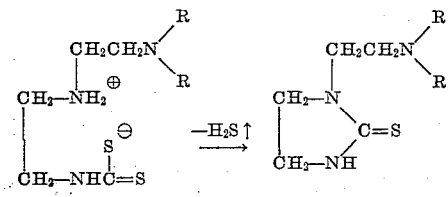

This cyclization reaction may be carried out by refluxing the internal salt in the presence of an inert solvent such as benzene, toluene, and like solvents until hydrogen sulfide evolution ceases. The cyclized products formed by either of these processes or modifications of these processes apparent to those familiar with the art can be purified by any of the several common processes available. As an example these new compounds may be purified by crystallization, by solvent extraction or other physical methods familiar to those versed in the art.

These new compounds are useful as rodenticides per se and as intermediates for the synthesis of biologically active compounds. 1-(β-diethylaminoethyl)-1,3-diazacyclopentane-2-thione is highly toxic for rats. In aqueous solution on intraperitoneal injection, it has an LD$_{50}$ of 11.2 mg./kg. Under similar conditions the LD$_{50}$ for 1-(β-dimethylamino-ethyl)-imidazolidine-2-thione is 65 mg./kg.

These compounds are useful also as intermediates because of the easy replacement of the sulfur atom with other groups. The following examples are given in illustration of this invention but are not to be construed as limiting the scope of the same.

EXAMPLE I

*1-(β-dimethylaminoethyl)-1,3-diazacyclopentane-2-thione*

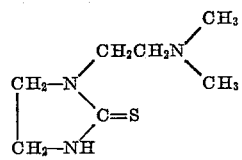

A solution of 0.1 part by weight of 1-dimethylamino-5-amino-3-azapentane ((CH$_3$)$_2$N(CH$_2$)$_2$NH(CH$_2$)$_2$NH$_2$) in 50 parts of 95% ethanol was added portionwise to a solution of carbon disulfide (5.4 parts) in 50 parts of 95% ethanol. The reaction was mildly exothermic and the mechanically stirred solution was maintained below 20° C. by cooling. The addition product of the amine carbon disulfide separated out from the solution as an oily layer. After removal of the ethanol by distillation, the residue was heated at 150° C. until the evolution of hydrogen sulfide ceased. The dark brown residue was dissolved in 50 parts of ether and then treated with charcoal. After removal of the charcoal by filtration, the filtrate on evaporation yielded 5.5 parts of a semi-crystalline product. This crude product was extracted with petroleum ether (8×200 parts). Removal of the petroleum ether by evaporation gave white crystals of 1-(β-dimethylaminoethyl)-1,3-diazacyclopentane-2-thione melting at 94–95° C. This melting point did not change on recrystallization of the product. Analysis of the new compound gave 18.65% sulfur, compared with the theoretical calculated for C$_7$H$_{15}$N$_3$S of 18.50%.

Its picrate formed in the usual manner melted at 166–167° C.

In a similar manner, using 1-dimethylamino-7-amino-4-azaheptane (CH$_3$)$_2$N(CH$_2$)$_3$NH(CH$_2$)$_3$NH$_2$ as the starting polyamine, there is obtained the 1-(α-dimethylaminopropyl) - 1,3 - diazacyclohexane - 2 - thione of the formula:

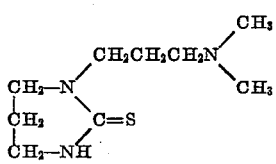

EXAMPLE II

*1-(β-diethylaminoethyl)-1,3-diazacyclopentane-2-thione*

1-diethylamino-5-amino-3-azapentane (40 parts by weight) in 75 parts of 95% ethanol was added portionwise to a solution of 28.8 parts of carbon disulfide in 75 parts of ethanol. During the reaction period, the temperature was held between 15-20° C. As the reaction proceeded, a gummy solid separated from the solution. This reaction mixture was allowed to stand at room temperature for one hour after which the ethanol was removed by evaporation. The residue was heated at 150° C. until the hydrogen sulfide, which was collected in an alkali trap, ceased to be evolved. The cooled reaction product was extracted with petroleum ether (15×400 parts). These combined extractions were evaporated to a small volume and on cooling a white crystalline solid separated, yield 27.7 parts. The melting point of the product was raised from 74-75° C. to a constant melting point of 77-78° C. by one crystallization from petroleum ether. Analysis of this new compound, 1-(β-diethylaminoethyl)-1,3-diazacyclopentane-2-thione, gave 16.10% sulfur, compared to the theoretical calculated for $C_9H_{19}N_3S$ of 15.93%.

Its picrate prepared in the usual manner melted at 141-142° C.

*1-(β-diethylaminoethyl)-1,3-diazacyclopentane-2-thione hydroiodide*

1 - (β - diethylaminoethyl) - 1,3 - diazacyclopentane-2-thione (15.6 parts by weight) was dissolved at room temperature in 60 parts of methanol containing 19.1 parts of hydriodic acid. Addition of 100 parts of ether resulted in the precipitation of the hydroiodide salt (21.5 parts, 84.4%). The product melted at 117-118° C. after one recrystallization from absolute ethanol. This new compound contained 12.76% nitrogen compared with the theoretical calculated for $C_9H_{20}IN_3S$ of 12.50% nitrogen.

In a similar manner, using 1-diethylamino-7-amino-4-azaheptane $(C_2H_5)_2N(CH_2)_3NH(CH_2)_3NH_2$ as the starting polyamine, there is obtained 1-(α-diethylaminopropyl)-1,3-diazacyclohexane-2-thione of the formula:

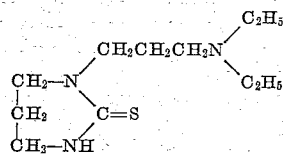

EXAMPLE III

*1-(β-di-n-propylaminoethyl)-1,3-diazacyclopentane-2-thione*

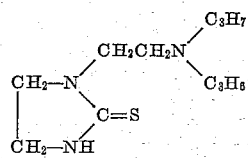

A solution of 1-di-n-propylamino-5-amino-3-azapentane (10 parts by weight) in 50 parts of 95% ethanol was added portionwise to a solution of carbon disulfide (6.1 parts) in 50 parts of ethanol at a temperature below 20° C. After the reaction mixture had remained overnight at room temperature, the solvent was removed by evaporation. The residue was heated at 150° C. until the evolution of hydrogen sulfide ceased. After pyrolysis, the residue was extracted with ether (1×50 parts) and the ethereal extract was concentrated to approximately one third of the original volume. This concentrated extract gave a white crystalline material which melted at 74-75° C. This melting point was not changed on repeated crystallization. Analysis of the new compound gave 14.15% sulfur, compared to the theoretical calculated for $C_{11}H_{23}N_3S$ of 13.97%.

Its picrate melted at 124-125° C.

*1-(β-di-n-propylaminoethyl)-1,3-diazacyclopentane-2-thione-hydroiodide*

1 - (β - di - n - propylaminoethyl) - 1,3 - diazacyclopentane-2-thione (0.2 part) was dissolved in 5 parts of methanol containing 0.45 part of hydriodic acid. Addition of 5 parts of ether resulted in the precipitation of the hydroiodide which melted at 147-148° C., yield 64%.

In a similar manner, using 1-di-n-propylamino-7-amino-4-azaheptane of the formula:

$$(C_3H_7)_2N(CH_2)_3NH(CH_2)_3NH_2$$

as the starting polyamine there is obtained 1-(α-di-n-propylaminopropyl)-1,3 - diazacyclohexane - 2 - thione of the formula:

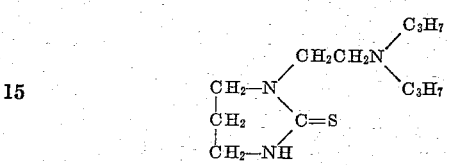

EXAMPLE IV

*1-(β-di-n-butylaminoethyl)-1,3-diazacyclopentane-2-thione*

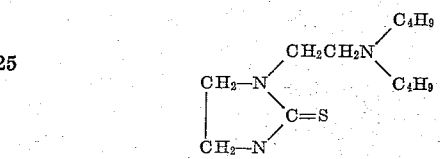

Six parts by weight of 1-di-n-butylamino-5-amino-3-azapentane in 25 parts of benzene was added portionwise to a solution of 3.2 parts of carbon disulfide in 25 parts of benzene at 15-20° C. The intermediate addition product separated from the solution as a finely divided solid. After removal of the benzene by evaporation, the residue was heated at 150° C. until no more hydrogen sulfide was evolved. This product was crystallized from petroleum ether (30 parts), yield 4 parts. The white crystalline product was purified by crystallization from petroleum ether to a constant melting point of 43-44° C. Analysis of this new compound gave 12.40% sulfur, compared to the theoretical calculated for $C_{13}H_{27}N_3S$ of 12.45%. Its picrate prepared in the usual manner melted at 115-117° C.

In a similar manner, using 1-di-n-butylamino-7-amino-4-azaheptane of the formula:

$$(C_4H_9)_2N\text{-}(CH_2)_3\text{-}N(CH_2)_3\text{-}NH_2$$

as the starting polyamine, there is obtained the 1-(α-di-n-butylaminopropyl-1,3-diazacyclohexane-2-thione.

We claim:

1. As a new product, a member of the group consisting of a 1,3-diazacycloalkane corresponding to the general formula:

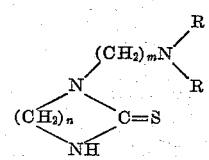

wherein R stands for a member selected from the group consisting of a straight and a branched chain alkyl radical having from 1 to 8 carbon atoms, and $n$ and $m$ each stand for an integer from 2 to 3, and its acid salts.

2. A member of the group consisting of 1-(β-dimethylaminoethyl)-1,3-diazacyclopentane-2-thione and its acid salts.

3. A member of the group consisting of 1-(β-diethylaminoethyl)-1,3-diazacyclopentane-2-thione and its acid salts.

4. A member of the group consisting of 1-(β-di-n-propylaminoethyl)-1,3-diazacyclopentane-2-thione and its acid salts.

5. As a new product, a member of the group consisting of a 1,3-diazacyclohexane of the formula:

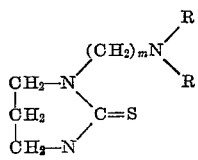

wherein R stands for a member of the group consisting of a straight and a branched chain alkyl radical having from 1 to 8 carbon atoms and $m$ stands for an integer from 2 to 3.

6. A process for preparing a 1,3-diazacycloalkane compound of the general formula:

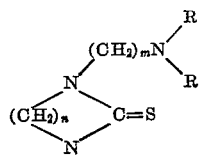

wherein R stands for a member of the group consisting of straight and branched chain alkyl radicals having from 1 to 8 carbon atoms and $n$ and $m$ each stands for an integer from 2 to 3, comprising reacting one mole of a polyamine of the formula

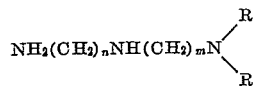

with one mole of carbon disulfide in the presence of an inert solvent, removing the solvent by distillation and heating the residue to a temperature of about 150° C. to obtain the desired 1,3-diazacycloalkane.

7. A process according to claim 6, wherein the desired 1,3-diazacycloalkane is obtained from the residue by refluxing in the presence of an inert solvent.

References Cited in the file of this patent

UNITED STATES PATENTS 2,613,211    Hurwitz et al. _____ Oct. 7, 1952